(12) United States Patent
Schrooten et al.

(10) Patent No.: US 9,056,449 B2
(45) Date of Patent: Jun. 16, 2015

(54) METHODS OF MANUFACTURING ELECTROCHEMICAL CELLS

(75) Inventors: Jeremy Schrooten, Mission (CA); Paul Sobejko, North Vancouver (CA); Erin Cooney, North Vancouver (CA)

(73) Assignee: Intelligent Energy Limited, Loughborough (GB)

( * ) Notice: Subject to any disclaimer, the term of this patent is extended or adjusted under 35 U.S.C. 154(b) by 849 days.

(21) Appl. No.: 12/242,231

(22) Filed: Sep. 30, 2008

(65) Prior Publication Data

US 2009/0095409 A1     Apr. 16, 2009

Related U.S. Application Data

(60) Provisional application No. 60/976,789, filed on Oct. 1, 2007.

(51) Int. Cl.
*H01M 8/02*     (2006.01)
*H01M 8/10*     (2006.01)
(Continued)

(52) U.S. Cl.
CPC ............... *B32B 38/14* (2013.01); *B32B 37/025* (2013.01); *B32B 37/153* (2013.01); *B32B 2309/04* (2013.01); *B32B 2309/105* (2013.01); *B32B 2309/12* (2013.01); *B32B 2310/0843* (2013.01); *B32B 2311/02* (2013.01); *B32B 2367/00* (2013.01); *B32B 2371/00* (2013.01); *B32B 2457/18* (2013.01); *H01M 4/86* (2013.01); *H01M 4/881* (2013.01); *H01M 4/8832* (2013.01); *H01M 4/8835* (2013.01);
(Continued)

(58) Field of Classification Search
None
See application file for complete search history.

(56) References Cited

U.S. PATENT DOCUMENTS 4,925,751 A * 5/1990 Shackle et al. ................ 429/314
5,190,834 A   3/1993 Kendall
(Continued)

FOREIGN PATENT DOCUMENTS

CN    1965108 A    5/2007
JP    2004517446 A  6/2004
(Continued)

OTHER PUBLICATIONS

"Japanese Application Serial No. 2008-256673, Office Action mailed Jun. 4, 2013", 6 pgs.

(Continued)

*Primary Examiner* — Jonathan Crepeau
(74) *Attorney, Agent, or Firm* — Baker & Hostetler, LLP

(57) ABSTRACT

Methods of manufacturing electrochemical cells having a current collector which, at least in part, underlies a catalyst layer are discussed. A method comprises patterning a current collector to have at least one electrolyte opening, disposing an electrolyte into or through the at least one opening, and disposing a catalyst, at least in part, over the disposed electrolyte. Optionally, the method comprises pattering a substrate and attaching a patterned current collector to each side thereof. Patterning of the current collector can include patterning a continuous sheet, which comprises at least a first and a second separable current collector. In one such example, a continuous carbon-fiber sheet impregnated or laminated with a nonporous material is patterned. In another such example, a continuous plastic material sheet impregnated with one or more electrical conductive particles is patterned. Among other things, the pattern of the current collector can include an extruded slot or adjacently-disposable strips.

22 Claims, 4 Drawing Sheets

(51) Int. Cl.
| | |
|---|---|
| *H01M 8/24* | (2006.01) |
| *H01M 4/86* | (2006.01) |
| *H01M 4/88* | (2006.01) |
| *B05D 5/12* | (2006.01) |
| *B32B 38/14* | (2006.01) |
| *B32B 37/00* | (2006.01) |
| *B32B 37/15* | (2006.01) |

(52) U.S. Cl.
CPC .......... *H01M8/0213* (2013.01); *H01M 8/0247* (2013.01); *H01M 8/1004* (2013.01); *H01M 8/1097* (2013.01); *H01M 8/241* (2013.01); *Y02E 60/521* (2013.01)

(56) References Cited

U.S. PATENT DOCUMENTS

| | | | | |
|---|---|---|---|---|
| 5,419,982 | A | * | 5/1995 | Tura et al. ................ 429/162 |
| 5,861,221 | A | * | 1/1999 | Ledjeff et al. ............ 429/465 |
| 6,127,058 | A | * | 10/2000 | Pratt et al. ................ 429/480 |
| 6,277,513 | B1 | * | 8/2001 | Swathirajan et al. ...... 429/519 |
| 6,291,091 | B1 | | 9/2001 | Preischl et al. |
| 6,413,284 | B1 | * | 7/2002 | Chu et al. .................. 29/623.1 |
| 6,492,046 | B1 | * | 12/2002 | Payne et al. ............... 429/407 |
| 6,521,110 | B1 | | 2/2003 | Hodges et al. |
| 6,641,862 | B1 | * | 11/2003 | Grot ........................... 427/115 |
| 6,752,842 | B2 | | 6/2004 | Luski et al. |
| 7,153,601 | B2 | | 12/2006 | Mardilovich et al. |
| 7,314,677 | B2 | | 1/2008 | Mosdale |
| 2004/0028975 | A1 | | 2/2004 | Badding et al. |
| 2004/0071865 | A1 | | 4/2004 | Mosdale et al. |
| 2004/0159964 | A1 | * | 8/2004 | Lavoie et al. ............. 264/40.1 |
| 2005/0227855 | A1 | * | 10/2005 | Manco et al. .............. 502/101 |
| 2005/0250004 | A1 | * | 11/2005 | McLean et al. ............ 429/122 |
| 2006/0154127 | A1 | * | 7/2006 | Eritate et al. ................. 429/30 |
| 2007/0026291 | A1 | * | 2/2007 | Kim et al. .................... 429/40 |
| 2007/0259242 | A1 | | 11/2007 | Schaevitz et al. |

FOREIGN PATENT DOCUMENTS

| | | |
|---|---|---|
| JP | 2009117350 A | 5/2009 |
| TW | 200935648 A | 8/2009 |

OTHER PUBLICATIONS

"Japanese Application Serial No. 2008-256673, Argument and Amendment filed Nov. 29, 2013 in response to Office Action mailed Jun. 4, 2013", (w/ English Translation of Amended Claims), 21 pgs.

"Taiwanese Application Serial No. 097137959, Office Action mailed Aug. 20, 2014", (w/ English Translation), 7 pgs.

"Taiwanese Application Serial No. 097137959, Response filed Mar. 24, 2014 to Office Action mailed Sep. 24, 2013", (w/ English Translation of Amended Claims), 9 pgs.

Taiwanese Application Serial No. 097137959, Office Action mailed Sep. 24, 2013, 14 pgs.

* cited by examiner

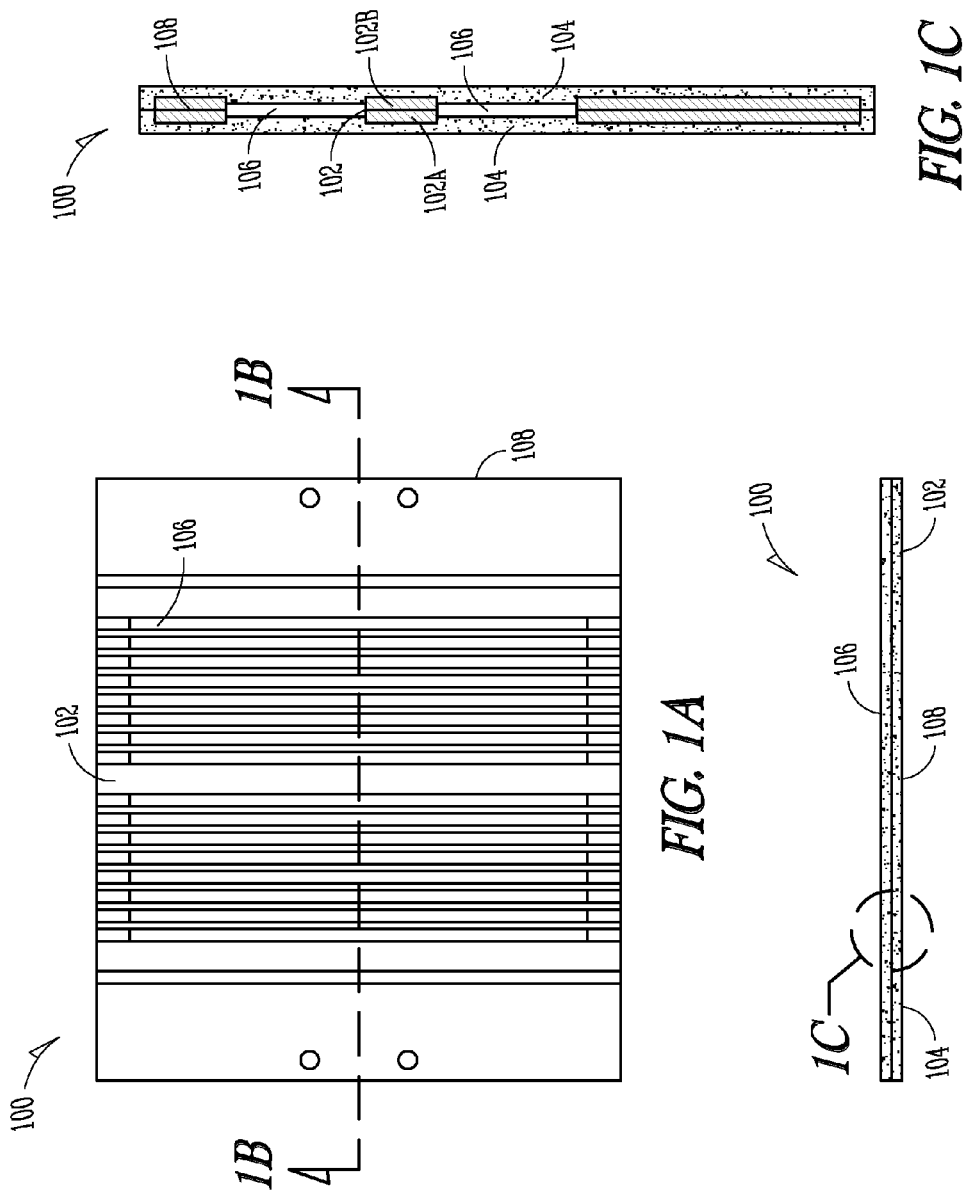

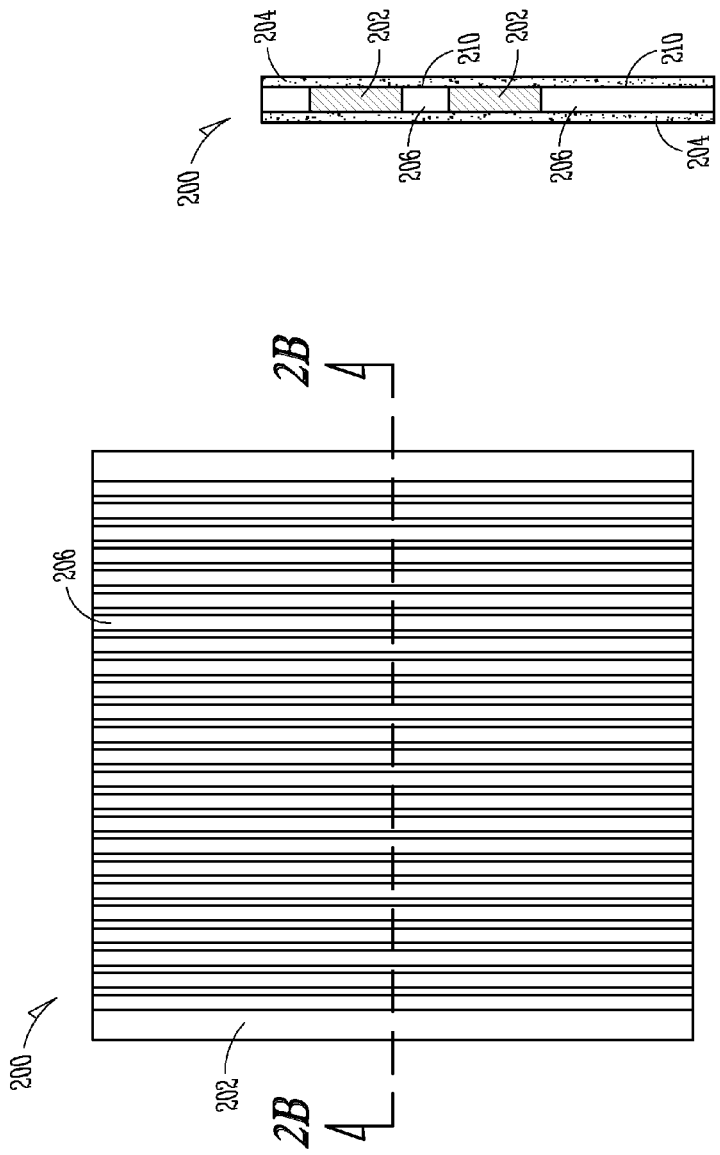

METHODS OF MANUFACTURING ELECTROCHEMICAL CELLS

PRIORITY OF INVENTION

This non-provisional application claims the benefit of priority under 35 U.S.C. §119(e) to U.S. Provisional Patent Application Ser. No. 60/976,789, filed Oct. 1, 2007, which is herein incorporated by reference.

BACKGROUND

Electrochemical cells convert fuel and oxidizing agents into electricity, heat, and water at two spatially separated electrodes, an anode and a cathode. The energy conversion process in electrochemical cells is distinguished from other energy conversion processes by its relatively high efficiency. For this reason, electrochemical cells are becoming increasingly important for transportation, mobile, stationary, portable, and micro applications.

During operation of an electrochemical cell, fuel reacts at an anode catalyst layer to form protons and electrons. The protons migrate through an ionomer exchange membrane to the cathode, while the electrons perform external work in a load before reaching the cathode. At the cathode, an oxygen-containing reactant (oxidant) supply combines with the protons and electrons to form water as a reaction product.

SUMMARY

Many electrochemical cells are a combination of many components, usually including some form of ionomer exchange membrane, some form of anode electrochemical reaction layer, some form of cathode electrochemical reaction layer, some form of porous conductive reactant diffusion media, and some form of reactant distribution system. These complex systems create many cost and manufacturing issues due to the inherent complexity of a multicomponent system. For instance, one problem in designing electrochemical cells is providing current collectors that permit current to be passed into or withdrawn from the cell, while permitting reactants to enter and products of the reactions to be removed from the cell.

The present inventors have recognized, among other things, methods of manufacturing electrochemical cells providing improved access for reactants to the electrochemical reaction sites are needed. In addition, the present inventors have recognized that such methods should, at least in some examples, be amenable to mass manufacturing techniques. Amenability to mass manufacturing techniques can improve manufacturing efficiency by increasing productivity and speed, thereby reducing production costs.

To this end, methods of manufacturing electrochemical cells having a current collector which, at least in part, underlies an electrochemical reaction layer (referred to herein as a "catalyst layer") are discussed. An example method comprises patterning a current collector to have at least one electrolyte opening, disposing an electrolyte into or through the at least one opening, and disposing a catalyst, at least in part, over the disposed electrolyte. Optionally, the method comprises patterning a substrate and attaching a patterned current collector to each side thereof. Patterning of the current collector can include patterning a continuous sheet comprising at least a first and a second separable current collector. In one such example, a continuous carbon-fiber sheet impregnated or laminated with a non-porous material is patterned. In another such example, a continuous plastic material sheet impregnated with one or more electrical conductive particles is patterned. The pattern of the current collector can be formed using a mass manufacturing process, such as a roll-to-roll or extrusion process. In some examples, the current collector pattern includes an extruded slot or strips. Upon being patterned, the current collector and optionally the substrate can be molded or laminated with a frame.

Embodiments of the present invention relate to a method for manufacturing an electrochemical cell. The method includes patterning a current collector including forming at least one electrolyte opening in a surface of the current collector, disposing an electrolyte in the at least one electrolyte opening and disposing a catalyst over at least a portion of the disposed electrolyte.

Embodiments also relate to method for manufacturing an electrochemical cell, including the steps of patterning a substrate including forming at least one electrolyte opening in the substrate, patterning at least one current collector, attaching the at least one current collector to each side of the substrate including aligning a opening in the current collector pattern with the at least one electrolyte opening in the substrate, disposing an electrolyte in the at least one electrolyte opening and disposing a catalyst over at least a portion of the electrolyte.

The present methods provide electrochemical cells having improved access for reactants to the electrochemical reaction sites. The methods, at least in some examples, are amenable to mass manufacturing techniques which potentially allow for increased productivity and lower production costs. These and other examples, advantages, and features of the present manufacturing methods will be set forth in part in the following Detailed Description. This Overview is intended to provide an overview of subject matter of the present patent document. It is not intended to provide an exclusive or exhaustive explanation of the invention. The Detailed Description and associated drawings are included to provide further information about the present patent document.

BRIEF DESCRIPTION OF THE DRAWINGS

In the drawings, like numerals describe similar components throughout the several views. Like numerals having different letter suffixes represent different instances of similar components. The drawings illustrate generally, by way of example, but not by way of limitation, various embodiments discussed in the present document.

FIG. 1A illustrates a plan view of an electrochemical cell, as constructed in accordance with at least embodiment.

FIG. 1B illustrates a cross-sectional view of an electrochemical cell, such as along line 1B-1B of FIG. 1A.

FIG. 1C illustrates an enlarged cross-sectional view of a portion of an electrochemical cell, such as portion 1C of FIG. 1B.

FIG. 2A illustrates a plan view of an electrochemical cell, as constructed in accordance with at least embodiment.

FIG. 2B illustrates a cross-sectional view of an electrochemical cell, such as along line 2B-2B of FIG. 2A.

FIG. 2C illustrates an enlarged cross-sectional view of a portion of an electrochemical cell, such as portion 2C of FIG. 2B.

DETAILED DESCRIPTION

Figure 2D:
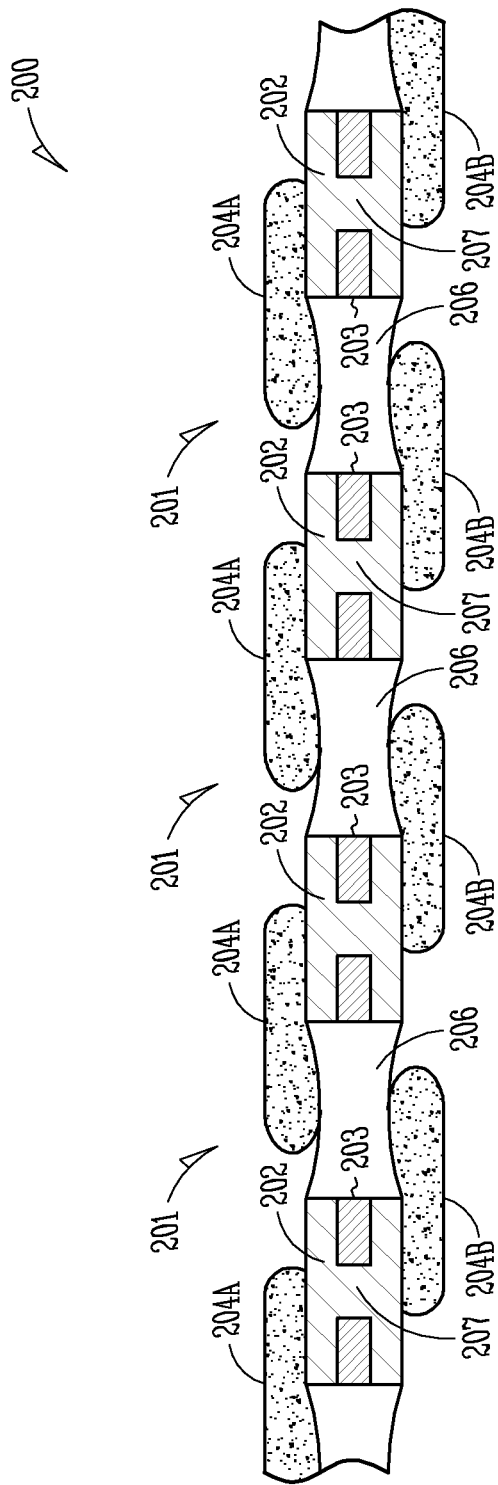
FIG. 2D illustrates an enlarged cross-sectional view of an alternative electrochemical cell embodiment comprising conductive vias.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

DEFINITIONS

As used herein, "electrochemical cell" refers to a device that converts chemical energy to electrical energy or converts electrical energy to chemical energy. Examples of electrochemical cells may include galvanic cells, electrolytic cells, electrolyzers, fuel cells, batteries and metal-air cells, such as zinc air fuel cells or batteries. Any suitable type of electrochemical cell including fuel cells and appropriate materials can be used according to the present invention including without limitation proton exchange membrane fuel cells (PEMFCs), direct methanol fuel cells (DMFCs), phosphoric acid fuel cells, solid oxide fuel cells (SOFCs), molten carbonate fuel cells (MCFCs), alkaline fuel cells, other suitable fuel cells, and materials thereof.

As used herein, "fluid" refers to a continuous, amorphous substance whose molecules move freely past one another and that has the tendency to assume the shape of its container. A fluid may be a gas, liquefied gas, liquid or liquid under pressure. Examples of fluids may include fluid reactants, fuels, oxidants, and heat transfer fluids. Fluid fuels used in fuel cells may include hydrogen gas or liquid and hydrogen carriers in any suitable fluid form. Examples of fluids include air, oxygen, water, hydrogen, alcohols such as methanol and ethanol, ammonia and ammonia derivatives such as amines and hydrazine, silanes such as disilane, trisilane, disilabutane, complex metal hydride compounds such as aluminum borohydride, boranes such as diborane, hydrocarbons such as cyclohexane, carbazoles such as dodecahydro-n-ethyl carbazole, and other saturated cyclic, polycyclic hydrocarbons, saturated amino boranes such as cyclotriborazane, butane, borohydride compounds such as sodium and potassium borohydrides, and formic acid.

As used herein, "flexible electrochemical layer" (or variant thereof) refers to include an electrochemical layer that is flexible in whole or in part, so-as-to embrace, for example, an electrochemical layer having one or more rigid components integrated with one or more flexible components. A "flexible fuel cell layer" refers to a layer comprising one or more fuel cells integrated into the layer.

As used herein, "flexible two-dimensional (2-D) fuel cell array" refers to a flexible sheet which is thin in one dimension and which supports a number of fuel cells. A flexible two-dimensional fuel cell array may be an example of a flexible fuel cell layer. The fuel cells have active areas of one type (e.g. cathodes) that are accessible from one face of the sheet and active areas of another type (e.g. anodes) that are accessible from an opposed face of the sheet. The active areas may be disposed to lie within areas on their respective faces of the sheet (e.g. it is not mandatory that the entire sheet be covered with active areas, however, the performance of a fuel cell may be increased by increasing its active area.

As used herein, "dielectric material" or "ion-conducting material" refers to a substance exhibiting negligible electrical conductivity. Dielectric materials may be used as substrates, for example. Dielectric materials may be understood to include ion-conducting materials, non-ion-conducting materials, and combinations thereof. Examples of ion-conducting materials include any ionomer or electrolyte suitable to the application, such as ion-exchange polymers, alkaline solutions, phosphoric acid, alkali carbonates, and oxide ion-conducting ceramics. Examples of non-ion-conducting materials include polymers, such as polyester, polypropylene, polyethylene, polycarbonate, polyimides, polyamides, fluoropolymers and other polymer films. An example of a polyimide includes Kapton™ film. An example of a fluoropolymer is PTFE (polytetrafluoroethylene) or Teflon™ film. Other fluoropolymers include PFSA (perfluorosulfonic acid), FEP (fluorinated ethylene propylene), PEEK (poly ethylene ether ketones) and PFA (perfluoroalkoxyethylene). Dielectric materials may also include reinforced composite materials such as fiberglass, any suitable non polymer materials such as silicon or glass, and combinations thereof. The dielectric material may include an electrolyte, for example. The electrolyte may be a solid electrolyte membrane.

As used herein, "catalyst", or "electrochemical reaction layer" refers to a material or substance (or layer of a material or substance) that assists in starting or increasing the rate of a reaction, without being modified or consumed itself. Catalyst layers may comprise any type of electrocatalyst suitable for the application at hand. Catalysts or catalyst layers may include pure platinum, carbon-supported platinum, platinum black, platinum-ruthenium, palladium, copper, tin oxide, nickel, gold, mixtures of carbon black, and one or more binders. Binders may include polypropylene, polyethylene, polycarbonate, polyimides, polyamides, fluoropolymers and other polymer films. An example of a polyimide includes Kapton™ film. An example of a fluoropolymer is PTFE (polytetrafluoroethylene) or Teflon™ film. Other fluoropolymers include PFSA (perfluorosulfonic acid), FEP (fluorinated ethylene propylene), PEEK (poly ethylene ether ketones) and PFA (perfluoroalkoxyethylene). The binder may also include PVDF (polyvinylidene difluoride) powder (e.g., Kynar™) and silicon dioxide powder. The binder may include any combination of polymers. The carbon black may include any suitable finely divided carbon material such as one or more of acetylene black carbon, carbon particles, carbon flakes, carbon fibers, carbon needles, carbon nanotubes, and carbon nanoparticles.

As used herein "continuous" refers to a method that describes a process, such as a reel-to-reel process, that produces a continuous sheet windable into a roll or other mass manufacturing form. Portions of this roll can be subsequently separated to a desired size and shape for use in electrochemical cells. To facilitate roll-to-roll processing, it may be desirable for the sheets to have a flexible and break-resistant structure.

As used herein, the term "unify," "unified," or "unifying" refers to the drying or balancing of a dimension. At least one dimension of a disposed electrolyte may be unified, for example.

As used herein, the term "dispose," "disposed," or "disposing" refers to putting an element in a particular or suitable place, and does not imply any directionality or required action.

FIGS. 1A-1C and 2A-2D illustrate electrochemical cells 100, 200 comprising a current collector 102, 202 underlying, at least in part, a catalyst layer 104, 204. Additional examples of electrochemical cells comprising an underlying current collector are discussed in commonly-owned McLean et al., U.S. patent application Ser. No. 11/047,560, titled "ELECTROCHEMICAL CELLS HAVING CURRENT-CARRYING STRUCTURES UNDERLYING ELECTROCHEMICAL REACTION LAYERS." Electrochemical cells according to the present invention may be flexible electrochemical layers, flexible fuel cell layers, or may form a flexible two-dimensional fuel cell array. The underlying positioning of the current collector 102, 202 provides reactants with improved access to the catalyst layer 104, 204, and may permit for the construction of electrochemical cells thinner in size than cells having a current collector(s) positioned on outer surfaces of the catalyst layers. Each cell comprises an ion exchange region having a catalyst layer 104, 204 on each side thereof. The ion exchange region includes an electrolyte 106, 206. Certain examples permit construction of an electrochemical cell layer comprising a plurality of individual unit cells formed into a sheet and coupled in series or parallel.

Referring to FIG. 1A, a plan view of an electrochemical cell 100 is shown. In this example, a substrate 108 supports a first and second current collector 102A, 102B (FIG. 1C), an electrolyte 106, and a catalyst layer 104. Examples of materials suitable as the substrate 108 include polyethylene, polypropylene, polycarbonate, polyimide, polyamide, or polyester, such as that marketed by E. I. DuPont under the trade name MYLAR®. The substrate 108 can also include an ionomer resin, such as a perfluorinated precursor resin (e.g., a resin marketed by E. I. DuPont under the trade name NAFION®) or an ionomeric material. The ionomer resin may be patterned, for example. In examples where the substrate 108 includes an ionomer resin, the material can be treated to be ionically conductive in at least one portion via a hydrolysis process. For example, at least a portion of the ionomer resin may be converted to an ion-conducting electrolyte form, including treating at least one portion of the substrate 108 with a hydrolysis process.

FIG. 1A illustrates that the current collectors 102 can include a pattern of one or more adjacently-disposed strip members. A space exists between adjacent strip members and is aligned with an electrolyte opening in the substrate. In this way, portions of the catalyst layer 104 can be disposed over the electrolyte 106 in the electrolyte opening. Materials suitable for use as the current collectors 102A, 102B include, but are not limited to, graphite, carbon, carbon fiber, conductive plastic such as but not limited to polyaniline, or metals such as but not limited to copper, nickel, silver, or gold, example. The current collector material may be any suitable conductive member. Materials utilized may also be manufactured from metals that are noble or are metals coated with a corrosion resistant layer, such as PEMCoat™ from INEOS Chlor™ Americas Inc., Wilmington, Del. or from conductive non-metals. The current collector may be manufactured of metals, metal foam, carbonaceous materials, graphite composite, conductive epoxy, carbon, graphite, carbon fibers, carbon nanotubes, electrically conductive ceramics, electrically conductive polymers or combinations thereof. The electrolyte 106 may be prevented from covering a portion of the current collector by at least one of masking, squeegeeing, scraping, sanding, polishing, machining, or etching a portion of the current collectors 102A, 102B.

FIG. 1B is a cross-sectional view of the electrochemical cell 100, such as along line 1B-1B of FIG. 1A. FIG. 1C is an enlarged view of a portion of the electrochemical cell cross-section, and illustrates the first and second current collectors 102A, 102B attached to respective sides of the substrate 108.

Referring to FIG. 2A, a plan view of an electrochemical cell 200 is shown. In this example, a current collector 202 supports an electrolyte 206, a catalyst layer 204, and optionally a release layer 210 (FIG. 2C). The current collector 202 can include a pattern of one or more slots, for example. The one or more slots form an electrolyte opening into which the electrolyte 206 can be disposed. (Note that the thickness of electrolyte 206 relative to that of current collectors 202 may vary by design and/or as a result of the method used to dispose the electrolyte into the openings and/or slots.) The release layer 210 can be attached about the slots to temporarily hold the disposed electrolyte in place until cured. Materials suitable for use as the current collector 202 include, but are not limited to, graphite, carbon, carbon fiber, conductive plastics such as but not limited to polyaniline, or metals such as but not limited to copper, nickel, silver, or gold. The catalyst layer 204 is disposed over the electrolyte 206 and includes a catalytically-active material, such as but not limited to, platinum, platinum black, carbon-supported platinum, platinum-ruthenium, palladium, nickel, gold, and combinations thereof.

FIG. 2B is a cross-sectional view of the electrochemical cell 200, such as along line 2B-2B of FIG. 2A. FIG. 2C is an enlarged view of a portion of the electrochemical cell cross-section, and illustrates an example slot pattern of the current collector 202.

FIG. 2D is an enlarged cross-sectional view of an alternative electrochemical cell embodiment 200 comprising conductive vias 207. Three micro fuel cells 201 arranged in series are shown in FIG. 2D. Current collectors 202 again include appropriate openings and/or slots in which electrolyte 206 is disposed. Anode catalyst 204a and cathode catalyst 204b are deposited on opposite sides of the sheet to create individual fuel cells 201. In this embodiment, an electrically insulating substrate 203 has been employed as a support. Along with appropriate openings and/or slots for electrolyte 206, substrate 203 also has openings for electrically conductive vias 207 that serve to connect the anode side of current collector 202 to the cathode side. This embodiment comprising current collectors with conductive vias may be fabricated according to the methods described in commonly-owned U.S. Patent Application US2008/0149371, titled 'FLEXIBLE CIRCUIT', the disclosure of which is incorporated herein in its entirety by reference.

Figure 3:
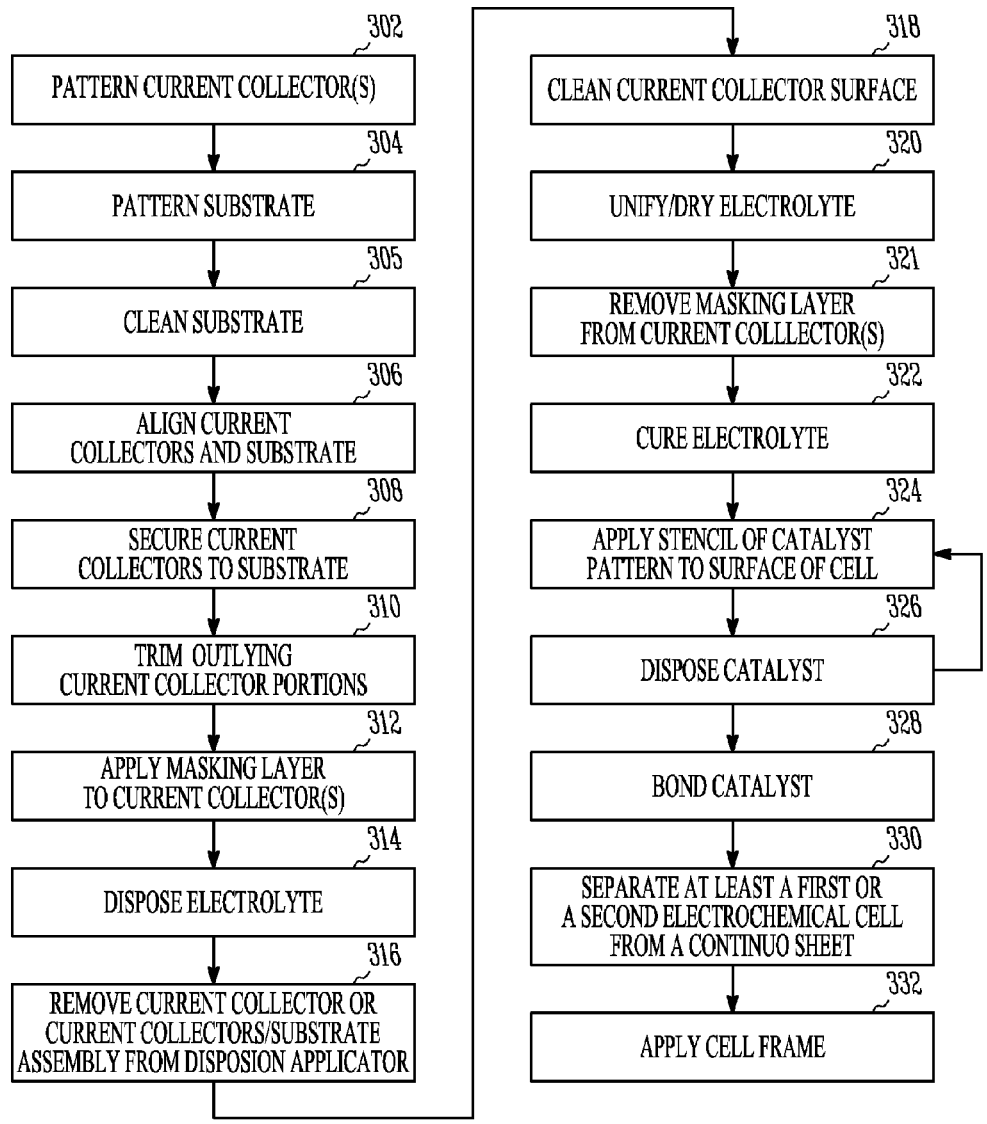
FIG. 3 illustrates an example method of manufacturing an electrochemical cell, as constructed in accordance with at least embodiment.

FIG. 3 illustrates an example method 300 of manufacturing an electrochemical cell or cell array (e.g. such as that depicted in FIG. 2D). At 302, a current collector can be patterned by forming at least one electrolyte opening in a surface thereof. The at least one electrolyte opening of the current collector can support an electrolyte or provide access to an electrolyte disposed in an electrolyte opening of a substrate, the latter of which can be patterned at 304. Patterning the current collector can include the patterning of a continuous current collector sheet, such as a continuous sheet stored in roll form. The continuous current collector sheet includes at least a first and a second current collector. In one example, the continuous current collector sheet includes a carbon-fiber sheet impregnated or laminated with a non-porous material. In another example, the continuous current collector sheet includes a plastic material sheet impregnated with one or more electrical conductive particles. In both such examples, the continuous current collector sheet can be formed using a mass manufacturing process, such as molding, extrusion or roll-to-roll process. In various examples, patterning the current collector sheet includes patterning a graphite-, carbon-, metal-, conductive plastic- or other conductive, corrosion tolerant-based material. In one example, patterning the current collector sheet includes patterning a roll of expanded graphite having a thickness of about 125 microns (µm).

Many different manufacturing processes can be used to pattern the current collector. For instance, mass manufacturing techniques, such as molding, extrusion or stamping, can be used to form the pattern. Beyond extrusion and stamping, a laser patterning process, a water jet patterning process, an abrasive jet patterning process, a chemical etching process, a mechanical machining process (i.e., sawing, grinding, etc.), or a die punching process can be used. In one example, forming the current collector pattern includes forming one or more adjacently-disposable strip members. In another example, forming the current collector pattern includes forming one or more slot regions, each region configured to support a disposed electrolyte. Patterns such as the strip members and slot regions provide for lower tolerancing and less precision than more intricate structures, such as a webbing of lumens. As a result, patterning of the current collector can be performed at faster rates.

At 304, a substrate is optionally patterned by forming desired electrolyte openings and openings for conductive vias in a surface thereof. If present, the electrolyte openings of the substrate can be used to support a disposed electrolyte. Material options for the substrate include, but are not limited to, polyethylene, polypropylene, polyester, polycarbonate, polyamide, polyimide, or combinations thereof. In one example, the patterning of the substrate includes patterning a roll of polyester having a thickness of about 25 microns (µm).

Many different manufacturing processes can be used to pattern the substrate. For instance, mass manufacturing techniques, such as molding or stamping, can be used to form the pattern. Beyond molding and stamping, a laser patterning process, a water jet patterning process, an abrasive jet patterning process, a chemical etching process, a mechanical machining process, or a die punching process can be used.

At 305 the substrate is thoroughly cleaned. Cleaning can be effected using mechanical or chemical processes such as but not limited to soap, water, an acid, a base, or an alcohol.

At 306, a patterned current collector is aligned and attached to each side of a patterned substrate. Alignment between the current collector and the substrate can include an alignment between respective electrolyte and conductive via openings. At 308, the patterned current collectors are secured to each side of the patterned substrate using at least one of a bonding or lamination process (e.g., axial lamination, isostatic lamination, or adhesive bonding). The lamination and bonding processes can be performed under at least one of heat and pressure. In examples using both heat and pressure for the lamination or bonding processes, such actions can be performed simultaneously or consecutively. In some examples, the heat applied during the lamination or bonding process is approximately equal to a softening or glass transition temperature ($T_g$) of the substrate. In one example, an axial press is preheated to about 140° C. and the sandwich assembly of the current collectors and the substrate is pressed at about 3000 psi for about 6 minutes. The heat and pressure also squeeze the current collectors on each side such that connections are made at vias 207 (i.e., as described in above mentioned US2008/0149371).

At 310, outlying current collector portions, such as excess graphite portions, may be trimmed to prevent shorting between individual electrochemical cells. Optionally, at 312, a layer of polyester (e.g., MYLAR®) or other suitable material having a pattern mirroring the pattern of the current collectors is attached to an outer surface thereof. This layer of polyester, for example, provides an electrolyte mask to portions of the current collector(s).

At 314, an electrolyte is disposed in the at least one electrolyte opening of the current collector or substrate. To fill the electrolyte openings, the current collector or the current collectors/substrate assembly can be placed in a bath comprising, at least in part, an ionomer dispersion. Among other things, the ionomer dispersion can include at least one of perfluorosulfonic acid, a copolymer of styrene and divinylbenzene, or polyarylene sulfonic acid. For instance, the ionomer dispersion bath can include 20% perfluorosulfonic acid dispersion, such as that marketed under the trade name NAFION®, and the current collector or current collectors/substrate assembly is allowed to sit therein until fully permeated. In one example, but as may vary, the current collector or current collectors/substrate assembly is fully permeated in about 4-8 hours. In another example, the electrolyte is disposed in the electrolyte openings by injection molding an ionomer resin. Other possible methods for disposing the electrolyte into the openings include dip casting, slot die casting, thin film casting, syringe injection, ink jet printing, or screen printing.

At 316, the current collector or current collectors/substrate assembly is removed from the electrolyte bath or other electrolyte disposing technique. In some examples, at 318, the current collector or assembly is squeegeed or otherwise cleaned as it is removed. (Optionally, this cleaning step may be performed after removal of the masking layer at step 321.) This cleaning prevents electrolyte from covering portions of the current collector(s). In some examples, at 320, at least one dimension of the disposed electrolyte is unified by exposing the electrolyte to a heated stream of fluid, such as air. Optionally, upon unification, disposed electrolyte in the at least one electrolyte opening can be dried using heat, at 320. The current collector or current collectors/substrate assembly supporting the electrolyte is placed into a hot oven set between about 30-120° C. for about 5-60 minutes. Optionally, at 321 the masking layer applied at 312 can be removed thereby removing unwanted electrolyte on the current collector(s) at the same time. Depending on the option, either after unification or after drying, disposed electrolyte in the at least one electrolyte opening can be cured, at 322, by placing the current collector or the current collectors/substrate assembly supporting the electrolyte into a hot oven set between about 120-140° C. for about 10-60 minutes. The curing temperature and time may change depending on the electrolyte material used. In some examples, the heat and application time needed to allow the electrolyte to cure is dependent on the ionomer used. After curing the electrolyte, any electrolyte remaining on the current collector(s) can be removed by scraping, sanding, polishing, machining or etching processes.

In one example, at 324, a first side of the assembly is pressed against a stencil, which outlines a catalyst pattern. The catalyst pattern, in some examples, covers all of the disposed electrolyte and overlaps onto, at least in part, the current collector(s). In one example, the first side of the assembly is pressed against a stainless steel stencil having a thickness of about 75 microns (μm) using about 1.5-3.0 psi. Once the stencil is secured against the side of the current collector, a catalytically-active material is disposed over the electrolyte, at 326. Disposing of the catalyst over the electrolyte includes disposing the catalyst such that it is in contact with at least a portion of the electrolyte and in contact with at least a portion of the current collector. The contact between the catalyst and the electrolyte or the current collector can establish a connection therebetween. In one example, the contact between the catalyst and the electrolyte establishes an ionic connection therebetween. In another example, the contact between the catalyst and the current collector establishes an electrical connection therebetween. Upon completion of catalyst disposition on the first electrochemical cell side, the cell can be flipped, and processes 324 and 326 are repeated on the second cell side. In some examples, catalyst may be disposed on both sides of the cell at the same time, or on one side after the other without the need for re-orientation of the cell.

Many different manufacturing processes can be used to dispose the catalyst. For instance, mass manufacturing techniques can be used to form the catalyst layer, such as spraying, screen printing, ink jet printing, or decal transferring. In one such example, a spray gun is used to directly spray catalyst ink onto the electrolyte ensuring the catalyst overlaps, at least in part, the current collector(s) using the stencil applied at 324. The catalyst ink can be prepared from a mixture of 1 part by weight platinum black, 2 parts by weight 10% water-based perfluorosulfonic acid dispersion, and 1 part by weight water, for example. This ink can be ball mixed for at least 24 hours prior to use. Following catalyzation, at 328 the electrochemical cell may be placed into an axial press and pressed at about 25-50 psi for about 1 minute to bond the catalyst layer to the cell.

Finally, at 330 and 332, at least a first or a second electrochemical cell are separated from a continuous sheet of electrochemical cells and supplied with a frame. While processes 330 and 332 may be performed earlier in the manufacturing process, such as prior to disposing the electrolyte at 314, manufacturing efficiency may warrant a continuous sheet-like electrochemical cell production until 330, in some examples. In one example, a thermoplastic frame is injection molded around the separated first and second electrochemical cells at 332. In another example, a frame is laminated around the first and second electrochemical cells at 332.

Electrochemical cells have been found to be reliable, efficient and convenient sources of power. However, current electrochemical cells have proved to be very expensive in terms of cost per unit of power delivered due, in part, to time-consuming methods of manufacturing. As a result, the practical utility of electrochemical cells has been limited. It is believed that the foregoing manufacturability issues may be alleviated by the present subject matter, including patterning a current collector to have at least one electrolyte opening, disposing an electrolyte into or through the at least one opening, and disposing a catalyst, at least in part, over the disposed electrolyte. Among other things, one or more processes of the present methods are amenable to mass manufacturing and as a result, can increase productivity speed and potentially reduce production costs.

What is claimed is:
1. A method for manufacturing an electrochemical cell array, comprising:
   patterning two or more distinct current collectors, each current collector including a conductive strip member portion adjacent to two dielectric strip members;
   arranging the two or more current collectors in spaced relation to one another to form at least one electrolyte opening in a space between sequential current collectors, such that the at least one electrolyte opening and the sequential current collectors are co-planar about a plane perpendicular to an array cross-sectional plane;
   disposing a frame around the two or more current collectors;
   disposing an electrolyte in the at least one electrolyte opening while the frame is disposed around the two or more current collectors; and
   disposing a catalyst over at least a portion of the disposed electrolyte and at least a portion of the two or more current collectors,
   wherein a release layer applied to at least one side of the electrolyte opening holds the disposed electrolyte in place for a period of time sufficient to allow the disposed electrolyte to cure and
   wherein the release layer is removed from the at least one side of the electrolyte opening after the disposed electrolyte is cured, and wherein the frame is disposed around a first and a second electrochemical cell of the electrochemical cell array.

2. The method of claim 1, wherein patterning the two or more current collectors includes patterning a continuous sheet of current collectors, the continuous sheet including at least a first current collector and a second current collector.

3. The method of claim 2, wherein patterning the continuous current collector sheet includes patterning a carbon-fiber sheet impregnated or laminated with a non-porous material.

4. The method of claim 1, wherein patterning the two or more current collectors includes extruding at least one of a plastic or electrical conductive material having the at least one electrolyte opening incorporated therein.

5. The method of claim 1, wherein patterning the two or more current collectors includes patterning a graphite-based material, a carbon-based material, or a metal-based material.

6. The method of claim 1, wherein disposing the electrolyte in the at least one electrolyte opening includes at least one of a dip casting process, a slot die casting process, a thin film casting process, a syringe injection process, an ink jet printing process, or a screen printing process.

7. The method of claim 1, wherein disposing the catalyst over at least the portion of the electrolyte and at least a portion of a current collector includes contacting the catalyst with at least a portion of the current collector to achieve a connection therebetween.

8. The method of claim 7, wherein contacting the catalyst with at least a portion of the current collector achieves an electrical connection.

9. The method of claim 1, wherein disposing the catalyst over at least the portion of the electrolyte includes at least one of a spraying process, a screen printing process, an ink jet printing process, or a decal transferring process.

10. The method of claim 1, wherein, after disposing the electrolyte, a portion of the disposed electrolyte covers at least a portion of one of the two current collectors, further comprising removing the portion of the disposed electrolyte from at least the portion of the one of the two current collectors by at least one of squeegeeing, scraping, sanding, polishing, machining, or etching.

11. The method of claim 1, wherein disposing the electrolyte in the at least one electrolyte opening includes disposing a curable dispersion.

12. The method of claim 1, wherein disposing the electrolyte in the at least one electrolyte opening includes injection molding an ionomer resin.

13. The method of claim 1, wherein patterning the two or more current collectors includes at least one of a molding, an extrusion, a stamping, a laser patterning, a water jet patterning, an abrasive jet patterning, a chemical etching, a mechanical machining, or a die punching process.

14. The method of claim 1, wherein patterning the two or more current collectors includes attaching the conductive strip member portion and the two dielectric strip members using a bonding or a lamination process.

15. The method of claim 1, further comprising bonding the catalyst to at least the disposed electrolyte using an applied pressure.

16. The method of claim 1, further comprising patterning the two dielectric strip members including forming at least one electrolyte opening in the dielectric strip members.

17. The method of claim 16, further comprising attaching the two or more current collectors to the dielectric strip members, including aligning the at least one electrolyte opening of the current collectors with the at least one electrolyte opening of the dielectric strip members.

18. A method for manufacturing an electrochemical cell array, comprising:
- patterning two or more distinct current collectors, each current collector including a longitudinal conductive strip member portion adjacent to two longitudinal dielectric strip members;
- arranging the two or more current collectors in spaced relation to one another to form at least one electrolyte opening in a space between sequential current collectors, such that the at least one electrolyte opening and the sequential current collectors are co-planar about a plane parallel to a length of the longitudinal conductive strip member portion and the two longitudinal dielectric strip members;
- disposing a frame around the two or more current collectors;
- applying a release layer to at least one side of the electrolyte opening;
- disposing an electrolyte in the at least one electrolyte opening while the frame is disposed around the two or more current collectors and holding the disposed electrolyte in place for a period of time sufficient to allow the disposed electrolyte to cure;
- removing the release layer from the at least one side of the electrolyte opening after the disposed electrolyte has cured; and
- disposing a catalyst over at least a portion of the disposed electrolyte and at least a portion of a current collector and applying a pressure to bond the catalyst to the portion of the disposed electrolyte and the portion of the current collector, and wherein the frame is disposed around a first and a second electrochemical cell of the electrochemical cell array.

19. The method of claim 18, further comprising patterning the two dielectric strip members including forming at least one electrolyte opening in the dielectric strip members.

20. The method of claim 19, further comprising attaching the two or more current collectors to the dielectric strip members, including aligning the at least one electrolyte opening of the current collectors with the at least one electrolyte opening of the dielectric strip members.

21. The method of claim 1, wherein disposing the electrolyte includes at least partially physically contacting the conductive strip member portion of each current collector and the adjacently disposed electrolyte.

22. The method of claim 18, wherein disposing the electrolyte includes at least partially physically contacting the conductive strip member portion of each current collector and the adjacently disposed electrolyte.

* * * * *